United States Patent Office.

THOMAS HANVEY, OF LANCASTER, NEW YORK.

Letters Patent No. 62,956, dated March 19, 1867.

IMPROVEMENT IN PREPARING AND PRESERVING WOOD.

*The Schedule referred to in these Letters Patent and making part of the same.*

TO ALL WHOM IT MAY CONCERN:

Be it known that I, THOMAS HANVEY, of the town of Lancaster, in the county of Erie, and State of New York, have invented a new and improved Process for Preparing Wood for use in the mechanic arts and preserving it from decay; and I do hereby declare that the following is a full and exact description thereof.

To practise my process I provide a tank or kettle of sufficient size and capacity to receive and hold a given quantity of wood or lumber to be treated, and sufficient water to fully immerse the wood. This tank or kettle (or other suitable vessel) is provided with a close-fitting top or cover, with a safety-valve or outlet for the escape of the surplus vapor or steam which may accumulate therein. It is connected by means of a suitable pipe or pipes with a steam boiler, so that steam may be conducted from the boiler to the tank, kettle, or other vessel, and cause the water to boil, the wood being immersed therein. Then either salt, saltpetre, sulphate of copper, or all or either two of these substances are put into and dissolved in the water. Then gas tar, gas-tar distillates, petroleum, animal or vegetable oils, saline or resinous bodies, or other like preservative and antiseptic substances, or either of such substances singly, or either two or more of them in combination, are put into the water in the tank and mixed and boiled therewith. These substances, or either of them, may be used without regard to definite and fixed quantities or proportions, the object being to use as much of either or all as the wood will take up in connection with the salt, saltpetre, or sulphate of copper, or enough to thoroughly saturate the pores and tissues of the wood; and if there be any excess it will remain in solution in the water for the next operation. The salt or saltpetre, or sulphate of copper, (or like penetrative substances, separately or in combination,) should be in all cases used in the practice of this process, and may be used without regard to definite and fixed proportions, further than to observe that a less quantity of saltpetre or sulphate of copper is required than of salt. A few pounds of salt will be required to ten gallons of water, while only a few ounces of saltpetre or sulphate of copper will be required to the same quantity of water. When these substances, or either of them, or any two or more them in combination, are mixed with the water in the tank or kettle, as before described; and the wood or lumber to be treated immersed therein, and the tank or kettle closely covered and connected with a steam boiler, as before described steam is let in, and the whole steam-boiled together for three or four hours, more or less. The boiling softens and expands the wood. All of the ingredients used will be held in solution in the water. The salt, saltpetre, and sulphate of copper, from their peculiar penetrative character, will permeate the woody tissues, and the other antiseptic substances which are held in solution will be driven into and penetrate the pores and tissues of the wood until the whole mass of the wood becomes thoroughly saturated therewith, and these substances having a great affinity for the wood will adhere therein and thereto and drive out and expel the moisture and sap which were in the wood when the process commenced, and when the wood is taken from the tank the water which held these substances in solution, and which was driven into the wood with these substances, will immediately evaporate, (by means of the heat contained therein,) leaving these substances solidified in the wood. All the moisture, sap, or other matter which has a tendency to produce decay or decomposition is excluded from the wood, the antiseptic matters remaining therein, and thus the wood is prepared for many years' preservation. The wood, whether dry or green, becomes thoroughly seasoned when subjected to this process.

This process is very simple and very cheap, and may be practised upon a large or small scale, and is available for the preparation of railroad ties, ship timbers, fence posts, and for lumber for all building purposes and for all kinds of cabinet work, and for inside and outside joiner work; in fact, there is no purpose for which wood, lumber, or timber is used in the mechanic arts, in which the lumber, wood, or timber is not improved in quality and durability by being subjected to this process.

What I claim as my invention, and desire to secure by Letters Patent, is—

The process of preparing wood for preservation, substantially as herein described.

THOS. HANVEY.

Witnesses:
E. B. FORBUSH,
B. H. MUEHLE.